A. F. LIDEN.
PLANER TOOL.
APPLICATION FILED FEB. 13, 1909.
943,086.
Patented Dec. 14, 1909.
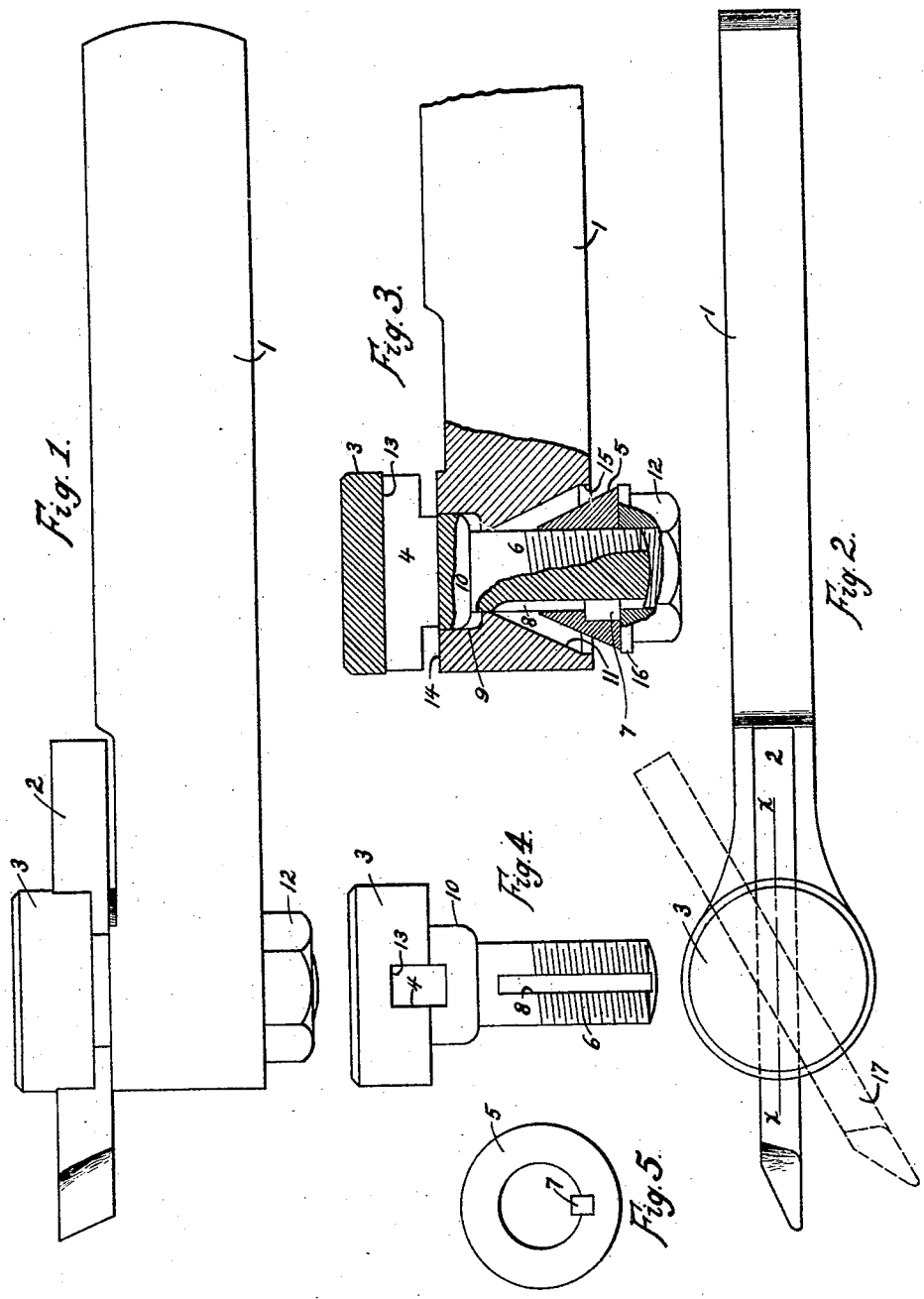
WITNESSES:
INVENTOR:
AUGUST FERDINAND LIDEN

UNITED STATES PATENT OFFICE.

AUGUST FERDINAND LIDEN, OF CHICAGO, ILLINOIS.

PLANER-TOOL.

943,086.  Specification of Letters Patent.  Patented Dec. 14, 1909.

Application filed February 13, 1909. Serial No. 477,711.

*To all whom it may concern:*

Be it known that I, AUGUST FERDINAND LIDEN, a subject of the King of Sweden, residing at Chicago, in the county of Cook and State of Illinois, have invented a new and useful Planer-Tool, of which the following is a specification, reference being had to the accompanying drawings, illustrating same.

My invention relates to tools, and more particularly to that class of tools used on planers, shapers, etc.

The principal objects of my invention are to provide improved means for clamping the cutting bit in such a tool in place, and to provide improved means whereby the cutting bit may be set at any angle desired, relatively to the shank of the tool.

Other objects will be apparent from the following specification.

In the accompanying drawings, illustrating the preferred form of my invention, Figure 1 is a side elevation of the tool of the invention; Fig. 2 is a top view of Fig. 1; Fig. 3 is a cross-sectional view of a portion of the tool, taken on line *x x* of Fig. 2, with portions shown in elevation; Fig. 4 is a side elevation of the clamping bolt for the cutting bit, showing the key-way therein; and Fig. 5 is a plan view of the tapered clamping collar used in the tool, showing the key seated therein.

Like characters refer to like parts in the several figures.

In the drawings 1 is the shank of the tool, which is adapted to be held in the head-stock of a planer or shaper.

2 is the cutting bit of the tool.

3 is the clamping bolt for the cutting bit 2, said bolt being provided with an opening 4 therethrough for accommodating the cutting bit 2 as shown.

5 is a tapered collar which is placed over the threaded portion 6 of the clamping bolt, as shown in Fig. 3, the collar 5 being provided with a key 7 attached thereto which key is slidably movable in the longitudinal key-way 8 of the clamping bolt. The shank member 1 is provided with a countersunk portion 9 on one side thereof, for accommodating the hub 10 of the clamping bolt 3, and with a conically-shaped recess 11 on the other side thereof, within which the tapered collar 5 fits.

12 is a nut adapted to be screwed on the threaded portion 6 of the clamping bolt to force the tapered collar 5 into the tapered recess 11 and thereby draw the head portion 3 of the clamping bolt down against the cutting bit 2 and thus clamp the latter against the surface 14 of the shank member 1. The tapered recess 11 is preferably sunken as shown at 15, to accommodate the annular rim 16 of the nut 12.

By means of the tapered collar 5, the tapered recess 11, and the nut 12, the cutting bit 2 can be very rigidly clamped in place so as to prevent it from turning out of the desired position. This clamping mechanism is so efficient that the cutting bit 2 may be set and clamped at any desired angle, relatively to the shank 1, as, for example, to the position 17 of Fig. 2, without the aid of any milled portions in the surface 14 of the shank member 1 to assist in holding the bit 2 in place. Thus it will be seen that the present invention, in which the cutting bit may be set at any desired angle, is a great improvement over other such tools in which the cutting bit can be set at only a few angles.

By means of the key 7 and the key-way 8, the clamping bolt 3 is prevented from turning in the collar 5; the latter being securely held in place in the recess 11 by the large tapered contact surfaces between the collar 5 and the shank member 1 which are rigidly clamped together. If by some extraordinary means the bolt 3 is turned, the key 7 will cause the collar 5 to turn with the bolt 3. This arrangement prevents such turning from loosening the nut 12, as the bolt 3, collar 5, and nut 12 all turn together.

I do not wish to limit this invention to all of the exact details of construction herein shown, as various modifications of same may be made without departing from the scope of the appended claims.

What I claim as my invention is:

1. A tool of the character described comprising a shank member, a bolt extending through the shank member, a cutting bit extending through the bolt, a tapered collar slidably placed on the said bolt and carried within a tapered recess in the shank member, and a nut on the said bolt engaging the said collar and forcing same into the said tapered recess to rigidly clamp the cutting bit against the shank member, for purposes substantially as described.

2. A tool of the character described comprising a shank member, a clamping member, a cutting bit carried by the said clamping member, a tapered collar slidably placed on the said clamping member, the said collar being carried within a tapered recess in the shank member, and means for drawing the said collar into the said tapered recess whereby the cutting bit is rigidly clamped in place by the said clamping member and the said shank member.

3. A tool of the character described comprising a shank member, a clamping bolt extending through the shank member, a cutting bit carried by the clamping bolt, a tapered collar on the clamping bolt, the said collar being carried within a tapered recess in the shank member, the said bolt having a key-way therein, a key carried by the said collar and fitting in the said key-way, and a nut on the bolt for drawing the said collar into the said tapered recess, for purposes substantially as described.

4. A tool of the character described having a shank member, a clamping bolt extending through the shank member, a cutting bit extending through the clamping bolt and bearing against a smooth surface on the shank member, a tapered collar slidably carried by the said bolt within a tapered recess in the shank member, and means for drawing the said collar into the said tapered recess whereby the cutting bit is rigidly clamped by the clamping bolt against the said smooth surface of the shank member at any desired angle.

5. A tool of the character described comprising a shank member having a recess therein, a clamping bolt extending through the shank member, a cutting bit carried by the said bolt, a collar movably keyed on the said bolt, and a nut on the said bolt for forcing the said collar into the said recess, for purposes substantially as described.

As inventor of the foregoing, I hereunto subscribe my name, February 1909.

GUST FERDINAND LIDEN.

Witnesses:
CONSTAN CARLSON,
O. J. NOTHENBERG.